US005915404A

United States Patent [19]

Satsu

[11] Patent Number: 5,915,404

[45] Date of Patent: Jun. 29, 1999

[54] QUICK EXHAUST VALVE

[75] Inventor: Takehiko Satsu, Wakayama-Ken, Japan

[73] Assignee: Kawaei Co., Ltd., Wakayama-Ken, Japan

[21] Appl. No.: 08/899,895

[22] Filed: Jul. 24, 1997

[30] Foreign Application Priority Data

Apr. 10, 1997 [JP] Japan .................................... 9-110340

[51] Int. Cl.[6] .................................................. F16K 11/065

[52] U.S. Cl. ............................................ 137/102; 601/150

[58] Field of Search ............................ 137/102; 601/150; 91/442

[56] References Cited

U.S. PATENT DOCUMENTS

| | | | |
|---|---|---|---|
| 2,162,671 | 6/1939 | Groeniger | 137/218 |
| 2,200,033 | 5/1940 | Marsak | 137/218 |
| 2,331,602 | 10/1943 | Edwards | 137/454.5 |
| 4,552,133 | 11/1985 | Kawaguchi | 137/102 X |
| 5,127,439 | 7/1992 | Stanchina | 137/873 X |

*Primary Examiner*—Gerald A. Michalsky
*Attorney, Agent, or Firm*—Wenderoth, Lind & Ponack, L.L.P.

[57] ABSTRACT

The invention provides a quick exhaust valve which allows compressed air to be smoothly supplied to and discharged from an air bag. The exhaust valve operates reliably even at low pressure or small quantity of air, and is capable of a quick exhaust of air. A valve body (11) has an opening (18) for connecting an exhaust port (17) to an air bag (A), and an inlet port (16) for compressed air. In this valve body (11), a valve member (13) comprising an opening/closing piece (20) for the exhaust port (17) and an opposing piece (21) for the inlet port (16) is arranged so it is movable in a direction to open and close the exhaust port (17). The opening/closing piece (20) and the opposing piece (21) of the valve member (13) are formed into an angle, preferably acute. This allows the opening/closing piece (20) to close the exhaust port (17) when the compressed air from the inlet port (16) is supplied. When the supply of compressed air is stopped, the valve member (13) is moved by the air bag side pressure, causing the exhaust port (17) to open. Thus, a quick exhaust can be attained.

41 Claims, 4 Drawing Sheets

(A)

(B)

(A)

(B)

QUICK EXHAUST VALVE

BACKGROUND OF THE INVENTION

The present invention relates to a quick exhaust valve which is used in various types of equipment utilizing compressed air. In particular, these include blood-circulation accelerators.

When the body is stressed or subjected to external pressure and then released from it repeatedly, the blood flow of the stressed part is accelerated, resulting in improved blood circulation. This result is a good treatment for diseases.

A blood-circulation accelerator which is capable of automatically and securely performing such stressing and releasing operations by utilizing compressed air is known. It is desired that such a blood-circulation accelerator perform the release of compressed air as quickly as possible. In order to achieve this objective, the present inventor has proposed a quick exhaust valve in Japanese Utility Model Laid-Open Publication SHO 61-42600.

In the quick exhaust valve, as shown in FIGS. 5A and 5B, an inlet port 2 for compressed air is provided at one end of a valve body 1, an opening 4 for connection with an air bag 3 is provided at another end thereof, and an exhaust port 5 is provided at a position opposite to the inlet port 2. A strip-shaped flexible valve membrane 6 with both ends fixed is also positioned in the valve body 1. As shown in FIG. 5A, a supply of compressed air from the inlet port 2 acts on the valve membrane 6, so that the valve membrane 6 closes the exhaust port 5. At the same time, the valve membrane is projected through the connection opening 4 into the air bag 3.

Thus, the compressed air is supplied into the air bag 3.

Unfortunately, the quick exhaust valve of the type comprising a strip-shaped valve membrane 6 has drawbacks. Because of the pressure acting on both sides of the valve membrane 6, the valve membrane 6 undergoes resistance in its motion during air exhaust. This results in poor operation at low pressure or small quantity of air.

Furthermore, since the connection opening 4 and the exhaust port 5 are perpendicular to each other, the air flow during exhaust is poor, resulting in inferior quick exhaust performance. Moreover, noise is generated due to a pulsating flow during the exhaust.

SUMMARY OF THE INVENTION

Therefore, an object of the present invention is to provide a quick exhaust valve which operates reliably even at low pressure or small quantity of air. Another object is to provide a quick exhaust valve which is capable of quick exhaust of air and quiet because it is free from pulsating flow.

In order to solve the above problems, there is provided a quick exhaust valve including a valve body having an exhaust port, a connection opening, and a compressed air inlet port located transverse to the exhaust port. The exhaust valve also includes a valve member comprising an exhaust port opening/closing piece and an opposing piece opposed to the inlet port. The valve member is positioned in the valve body so that the opening/closing piece is moveable, e.g., by sliding, in a direction in which the exhaust port is opened and closed. The opening/closing piece and the opposing piece of the valve member are arranged to form an angle, preferably an acute angle.

In the present invention, the exhaust port and the connection opening provided in the valve body are substantially aligned on opposite sides of the valve body. When compressed air is supplied through the inlet port, the opening/closing piece is moved, due to a pressure acting on the opposing piece from the supply of compressed air, to a position so that the opening/closing piece closes the exhaust port. In this position, the compressed air flows to the connection opening through a space formed between the lower end of the opposing piece and the bottom of the valve body.

When the supply of compressed air through the inlet port is stopped, the pressure inside the air bag acts on an inner corner portion of the valve member. This pressure provides buoyancy for the valve member and moves it to the valve-opening position smoothly. Thus a quick exhaust of air can be achieved.

BRIEF DESCRIPTION OF THE DRAWINGS

FIGS. 3(A) and 3(B) are longitudinal sectional views showing a state of the quick exhaust valve when compressed air flows in;

FIG. 5(A) is a longitudinal sectional view showing a state of a quick exhaust valve according to the prior art when compressed air flows in; and FIG. 5(B) is a longitudinal section view showing a state of the prior-art quick exhaust valve when compressed air is discharged out.

DETAILED DESCRIPTION OF THE PREFERRED EMBODIMENTS

An embodiment of the present invention will now be explained in conjunction with an example as illustrated in the accompanying drawings.

Figure 1:
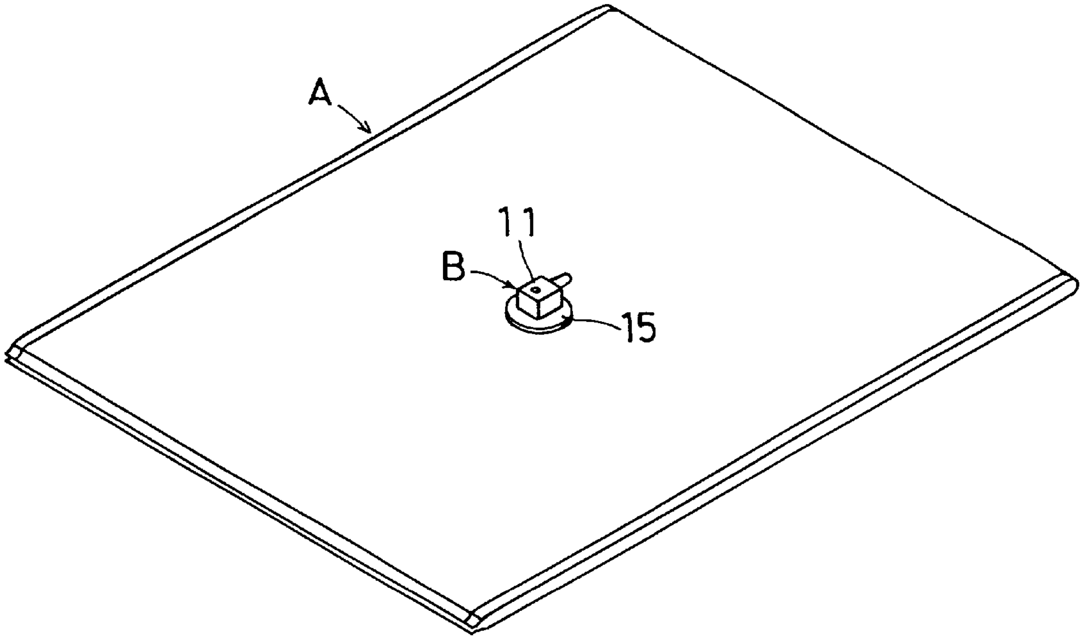
FIG. 1 is a perspective view of the air bag to which the quick exhaust valve is fitted.

FIG. 1 shows an air bag A to be used, for example, by wrapping it around the belly. This air bag A is equipped with a quick exhaust valve B that performs the supply and release of compressed air.

Figure 2:
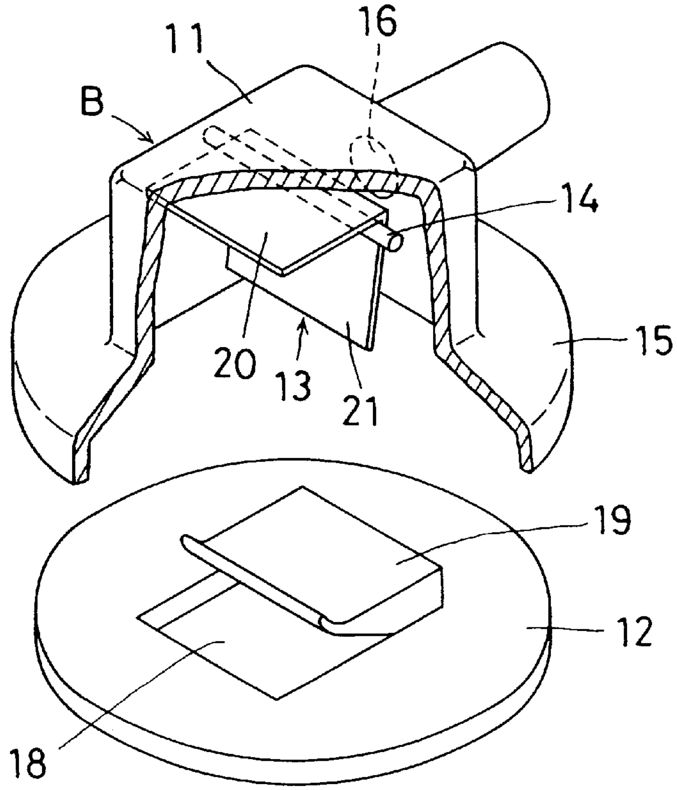
FIG. 2 is an exploded perspective view of the quick exhaust valve.
Figure 3:
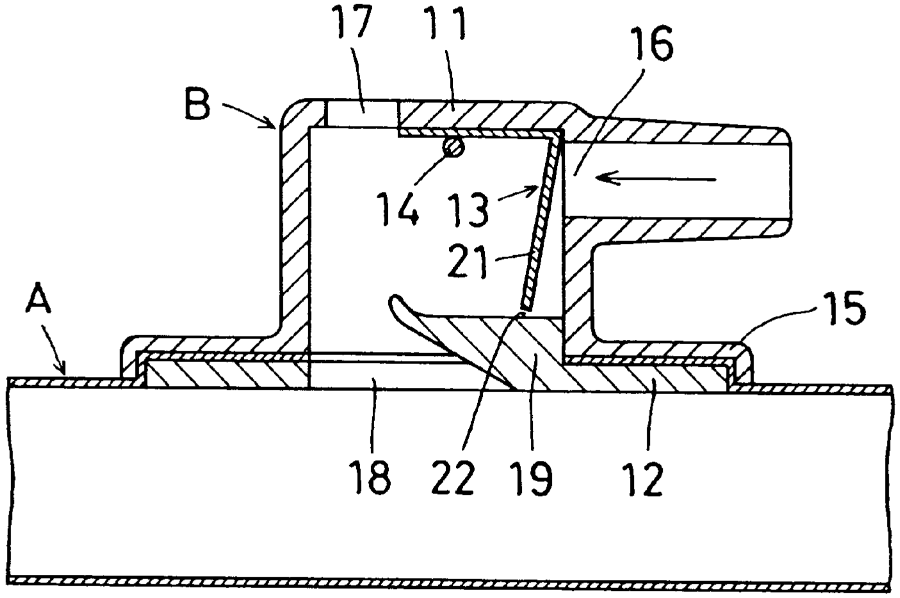
Figure 3:
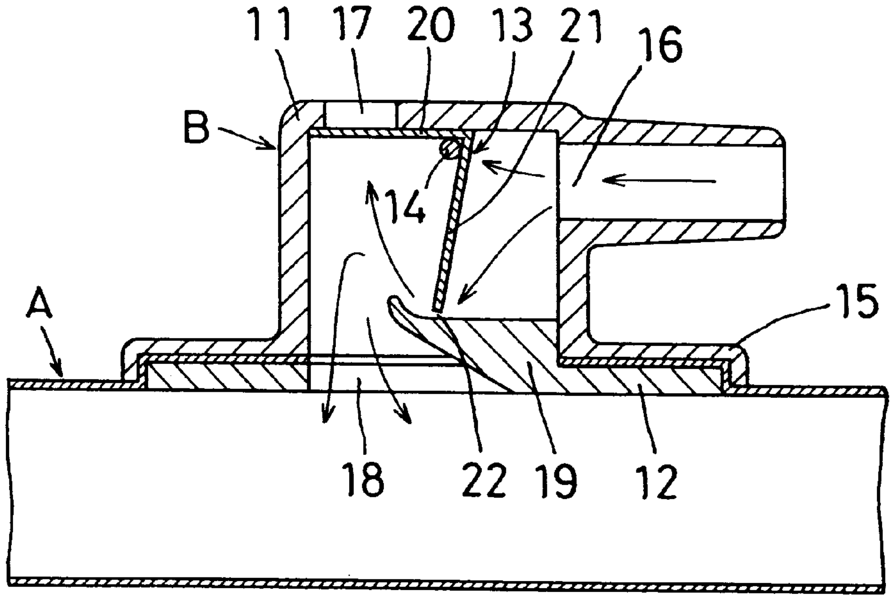
Figure 4:
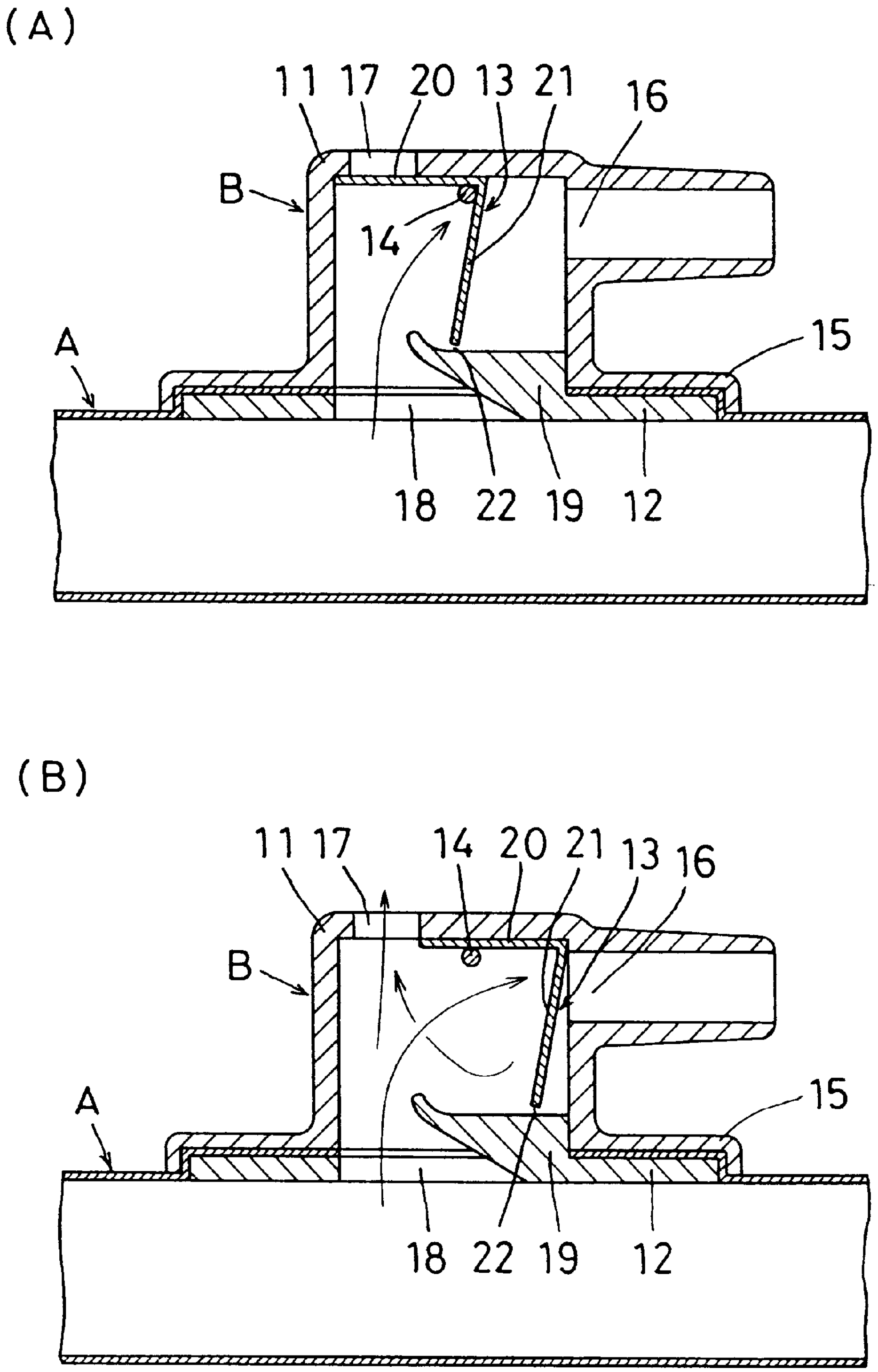
FIGS. 4(A) and 4(B) are longitudinal sectional views showing a state of the quick exhaust valve when compressed air is discharged out.
Figure 5:
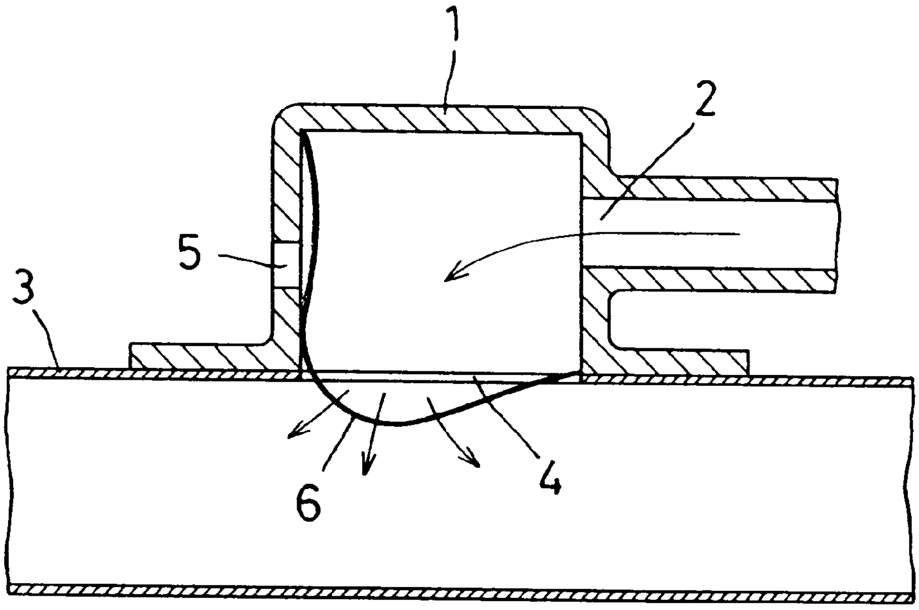
Figure 5:
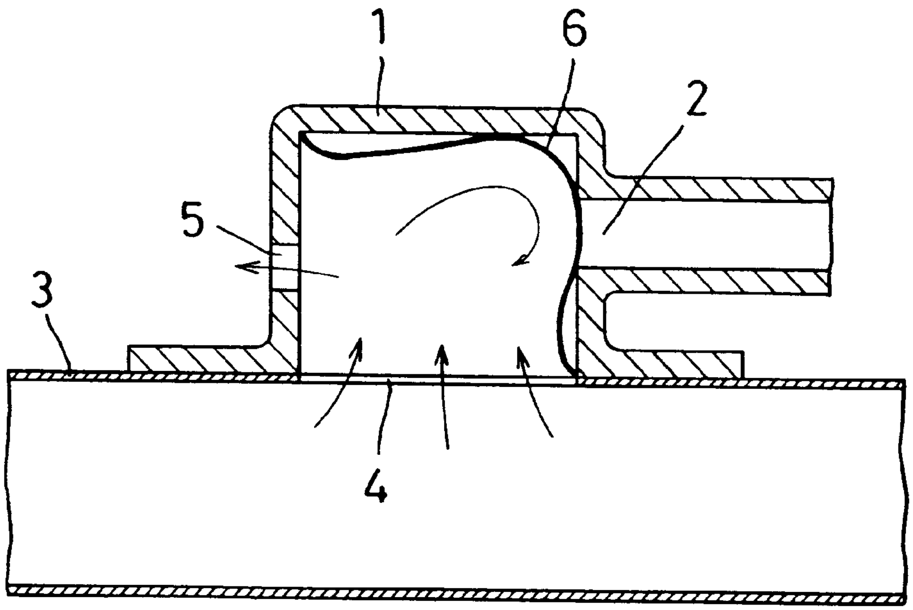

The quick exhaust valve B, as shown in FIGS. 2–4, includes a valve body 11, a fitting seat plate 12 which is fitted and fixed at its periphery along with the valve body 11, to an opening formed in the air bag A. A valve member 13 is movably positioned into the valve body 11, and a support member 14 for supporting the valve member, such as a cylindrical shaft, is positioned within the valve body 11.

The valve body 11 is formed into a hollow, square box shape with the lower face opened, having a flange portion 15 formed around the lower periphery. In the valve body 11, an inlet port 16 connecting to a supply source of compressed air is provided in one surface of the peripheral wall, and an exhaust port 17 is provided in the top wall. The inlet port 16 and exhaust port 17 are arranged so that the inlet port 16 and the exhaust port 17 have a positional relation of being transverse, and, preferably, perpendicular to each other.

The fitting seat 12 is formed into a disc shape so that it fits to the flange portion 15 to thereby fix the air bag A. In the center of the fitting sheet 12, an opening 18 for connection and a projection 19, directed toward the top and located on one side of the opening 18, are provided. The valve body 11 is closed as part of its lower opening by the projection 19, and the rest of the lower opening corresponds with the opening 18. In this manner, the exhaust port 17 and the opening 18 are substantially aligned.

The valve member 13 comprises an opening/closing piece 20 for the exhaust port 17, and an opposing piece 32 opposed to the inlet port 16. The valve body 13 is arranged in the valve body 11 in such a way that the opening/closing piece 20 overlaps the inner surface of the top wall while the opposing piece 21 is opposed to the inlet port 16. Further, the valve member 13 is held by the top wall of the valve body 11 and the support member 14 such as a shaft so that the opening/closing piece 20 is movable in such a direction as to open and close the exhaust port 17.

This valve member 13 is made by using synthetic resin so that the opening/closing piece 20 and the opposing piece 21 preferably form an acute angle. A clearance 22 for allowing compressed air from the inlet port 16 to pass through toward the connection opening 18 is formed between the lower end of the opposing piece 21 and the projection 19.

The quick exhaust valve of the present invention is constructed as described above. As shown in FIG. 3(A), when compressed air is supplied from the inlet port 16 into the valve body 11, as indicated by the arrows, while the valve body 13 is in a position with the exhaust port 17 opened, pressure acts on the outer surface of the opening piece 21. This pressure causes the valve member 13 to move in such a direction that the opening/closing piece 20 closes the exhaust port 17.

The valve member 13, in turn, is so arranged that the opposing piece 21 preferably forms an acute angle with the opening closing piece 20. Therefore, as shown in FIG. 3(B) when the compressed air acts on the other surface of the opposing piece 21, the opening/closing piece 20 closes the exhaust port 17, and has a spring force acting thereon about a fulcrum of the support shaft 14, thereby shielding the exhaust port 17 securely.

With the exhaust port 17 shielded as shown in FIG. 3(B), the compressed air supplied through the inlet port 16 passes the clearance 22 between the lower end of the opposing piece 21 and the projection 19 as indicated by arrows, entering into the air bag A through the connection opening 18. Thus, the air bag A is expanded.

Next, when the supply of compressed air through the inlet port 16 is stopped, the air in the air bag A is at a high pressure. The air acts most effectively on the inner corner portion of the valve member 13 as indicated by the arrow in FIG. 4(A).

This can be attributed to the fact that since the opening/closing piece 20 and the opposing piece 21 form an acute angle in the valve member 13, pressure concentrates on the inner corner portion thereof so that the valve body 13 has buoyancy applied thereto. This allows it to slide smoothly to the valve-opening position. This is an advantage that could not be obtained when the opening/closing piece 20 and the opposing piece 21 are perpendicular to each other.

When the valve member 13 has moved to the valve-opening position, the exhaust port 17 and the connection opening 18 are in line. As a result, the air in the air bag A is promptly released outside in a quick manner.

As shown above, the supply and stop of compressed air through the inlet port 16 causes the quick exhaust valve B to be automatically opened and closed. Therefore, the blood-circulation accelerator repeats the stressing and releasing operations.

As described above, since the opening/closing piece and the opposing piece of the valve member positioned inside the valve body are formed into an acute angle, buoyancy is applied to the valve member. The valve member is opened and closed by the pressure of compressed air, so that the valve member operates smoothly even at low pressure or small quantity of air. Thus, a prompt opening/closing operation can be achieved.

Also, the exhaust port and the connection opening are aligned in the valve-opened state, so that the air within the air bag can be exhausted promptly. In addition, since no pulsating flow occurs, the valve operation becomes quiet.

Furthermore, unless external factors are involved, the valve member located inside will not move, so that even air of slight pressure can be completely purged out when the pressure is removed.

What is claimed is:

1. A quick exhaust valve comprising:

a valve body having a compressed air inlet port, a connection opening, and an exhaust port, said inlet port being transverse to said exhaust port;

a valve member including an exhaust port opening/closing piece and an inlet port opposing piece extending at an angle to said opening/closing piece, wherein said angle comprises an acute angle; and said valve member being positioned within said valve body for sliding movement between a first position, whereat said opposing piece confronts said inlet port and said opening/closing piece does not block said exhaust port, and a second position, whereat said opposing piece is spaced from said inlet port and said opening/closing piece blocks said exhaust port.

2. The exhaust valve of claim 1, wherein said opening/closing piece has a planar configuration.

3. The exhaust valve of claim 2, wherein said opposing piece has a planar configuration.

4. The exhaust valve of claim 1, wherein said opposing piece has a planar configuration.

5. The exhaust valve of claim 1, wherein said inlet port is perpendicular to said exhaust port.

6. The exhaust valve of claim 1, further comprising a support member supporting said valve member within said valve body.

7. The exhaust valve of claim 6, wherein said support member supports said opening/closing piece.

8. The exhaust valve of claim 6, wherein said support member comprises a shaft.

9. The exhaust valve of claim 8, wherein said shaft is cylindrical.

10. The exhaust valve of claim 1, wherein said exhaust port is substantially aligned with said connection opening.

11. The exhaust valve of claim 10, wherein said exhaust port and said connection opening are located on opposite sides of said valve body.

12. The exhaust valve of claim 1, further comprising a projection extending over a portion of said connection opening, a space being defined between said projection and an end of said opposing piece.

13. The exhaust valve of claim 1, wherein said valve member is formed of a synthetic resin material.

14. The exhaust valve of claim 13, wherein said valve member including said opening/closing piece and said opposing piece is of a unitary construction.

15. The exhaust valve of claim 14, wherein said valve member including said opening/closing piece and said opposing piece is of a unitary construction.

16. A quick exhaust valve comprising:

a valve body having a compressed air inlet port, a connection opening, and an exhaust port, said inlet port being transverse to said exhaust port, and said exhaust port being substantially aligned with said connection opening;

a valve member including an exhaust port opening/closing piece and an inlet port opposing piece extending at an angle to said opening/closing piece; and said valve member being positioned within said valve body for sliding movement between a first position, whereat said opposing piece confronts said inlet port and said opening/closing piece does not block said exhaust port, and a second position, whereat said opposing piece is spaced from said inlet port and said opening/closing piece blocks said exhaust port.

17. The exhaust valve of claim 16, wherein said opening/closing piece has a planar configuration.

18. The exhaust valve of claim 17, wherein said opposing piece has a planar configuration.

19. The exhaust valve of claim 16, wherein said opposing piece has a planar configuration.

20. The exhaust valve of claim 16, wherein said inlet port is perpendicular to said exhast port.

21. The exhaust valve of claim 16, further comprising a support memebr supporting said valve member within said valve body.

22. The exhaust valve of claim 21, wherein said support member supports said opening/closing piece.

23. The exhaust valve of claim 21, wherein said support member comprises a shaft.

24. The exhaust valve of claim 23, wherein said shaft is cylindrical.

25. The exhaust valve of claim 16, wherein said exhaust port and said connection opening are located on opposite sides of said valve body.

26. The exhaust valve of claim 16, further comprising a projection extending over a portion of said connection opening, a space being defined between said projection and an end of said opposing piece.

27. The exhaust valve of claim 16, wherein said valve member is formed of a synthetic resin material.

28. The exhaust valve of claim 27, wherein said valve member including said opening/closing piece and said opposing piece is of a unitary construction.

29. The exhaust valve of claim 16, wherein said valve member including said opening/closing piece and said opposing piece is of a unitary construction.

30. A quick exhaust valve comprising:

a valve body having a compressed air inlet port, a connection opening, and an exhaust port, said inlet port being transverse to said exhaust port;

a valve member including an exhaust port opening/closing piece and an inlet port opposing piece extending at an angle to said opening/closing piece;

a projection extending over a portion of said connection opening, a space being defined between said projection and an end of said opposing piece; and said valve member being positioned within said valve body for sliding movement between a first position, whereat said opposing piece confronts said inlet port and said opening/closing piece does not block said exhaust port, and a second position, whereat said opposing piece is spaced from said inlet port and said opening/closing piece blocks said exhaust port.

31. The exhaust valve of claim 30, wherein said opening/closing piece has a planar configuration.

32. The exhaust valve of claim 31, wherein said opposing piece has a planar configuration.

33. The exhaust valve of claim 30, wherein said opposing piece has a planar configuration.

34. The exhaust valve of claim 30, wherein said inlet port is perpendicular to said exhaust port.

35. The exhaust valve of claim 30, further comprising a support member supporting said valve member within said valve body.

36. The exhaust valve of claim 35, wherein said support member supports said opening/closing piece.

37. The exhaust valve of claim 35, wherein said support member comprises a shaft.

38. The exhaust valve of claim 37, wherein said shaft is cylindrical.

39. The exhaust valve of claim 30, wherein said valve member is formed of a synthetic resin material.

40. The exhaust valve of claim 39, wherein said valve member including said opening/closing piece and said opposing piece is of a unitary construction.

41. The exhaust valve of claim 30, wherein said valve member including said opening/closing piece and said opposing piece is of a unitary construction.

* * * * *